(No Model.)

S. J. CROUCH.
SAW SET.

No. 457,184. Patented Aug. 4, 1891.

Witnesses:
J. B. McGirr.
C. M. Buckley

Inventor:
Seborn J. Crouch
by Connolly Bros.
Atty's

UNITED STATES PATENT OFFICE.

SEBORN JEFFERSON CROUCH, OF HIGH POINT, NORTH CAROLINA, ASSIGNOR OF TWO-THIRDS TO JOSEPH J. COX AND EDWIN D. STEELE, BOTH OF SAME PLACE.

SAW-SET.

SPECIFICATION forming part of Letters Patent No. 457,184, dated August 4, 1891.

Application filed February 27, 1891. Serial No. 383,033. (No model.)

*To all whom it may concern:*

Be it known that I, SEBORN JEFFERSON CROUCH, a citizen of the United States, residing at High Point, in the county of Guilford and State of North Carolina, have invented certain new and useful Improvements in Saw-Setting Apparatus; and I do hereby declare the following to be a full, clear, and exact description of the invention, reference being had to the accompanying drawings, which form part of this specification.

This invention has relation to saw-sets, and has for its object the provision of novel means for setting the teeth of both straight and circular saws expeditiously and uniformly and without particular skill or practice on the part of the operator.

Ordinarily saws have been set by fastening them in a vise and bending or setting the teeth one by one through the agency of a hammer or other hand-tool. This operation is necessarily slow and laborious and requires great care and attention on the part of the workman, and is otherwise objectionable on account of the difficulty of setting all the teeth at precisely the same angle.

My invention consists in the novel construction, combinations, and arrangements of parts hereinafter described and specifically claimed, and the apparatus embodying my invention comprises a suitable table or stand and adjustable vise for holding a saw in position while being set, a movable jaw, a suitable actuating-lever attached to said jaw, an adjustable anvil, and means for adjusting said anvil to different heights and angles to suit the work in hand.

Figure 1:
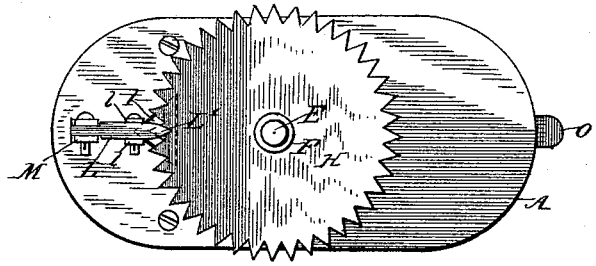
Figure 2:
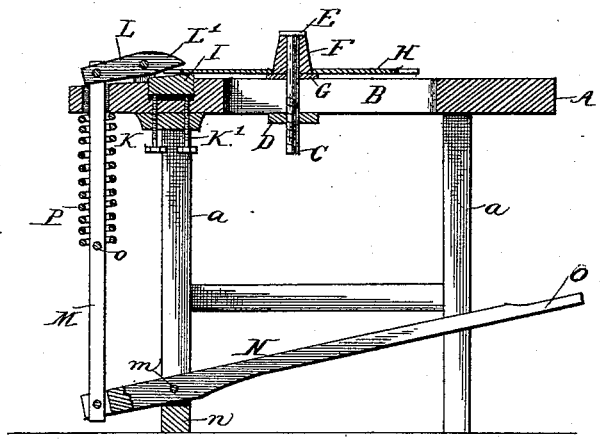
Figure 3:
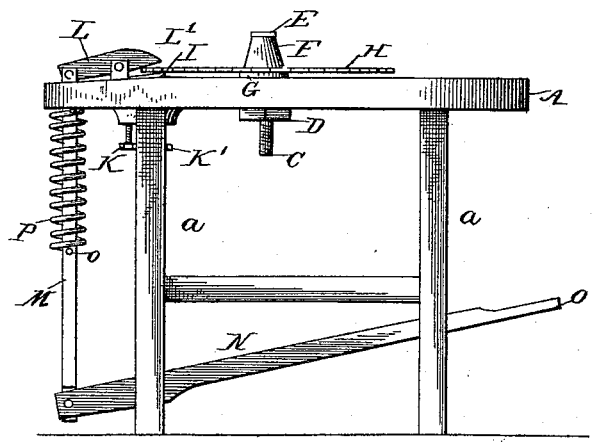

Referring to the accompanying drawings, Figure 1 is a top view; Fig. 2, a vertical longitudinal sectional view; Fig. 3, a side elevation, and Fig. 4 a top view with a straight saw in position to be set.

A designates a flat bench, table, or stand mounted on legs *a a* and of any suitable height or dimensions. The bench A is formed with a longitudinal slot B, through which passes a vertical bolt C, screw-threaded on its lower end and provided with a nut D, and having on its upper end a head E, that serves to hold in position a removable sleeve F and a flat washer or plate G, the function of the sleeve being to sustain in proper position the saw H, which is being set, the sleeve passing through the hole in the center of the saw. A number of sleeves of different diameters are provided, so as to fit saws having different-sized holes, and the several-sized sleeves are readily substituted for one another by unscrewing the nut D and removing the bolt C from the slot B, the sleeve then on the bolt being replaced by one of a different size and the bolt replaced in position in the slot.

Near one end of the table A is arranged a metallic anvil I, of a triangular or other desired shape, which is set in a socket in the top of the table, and is adjustable in a vertical direction by means of two set-screws K K', passing up through the table and contacting with the bottom of the anvil. The screws K K' are arranged in line with the slot B, and by the movement of one of the screws the angle of the top surface of the anvil with relation to the flat surface of the table may be varied to any required degree, while by moving both screws the anvil may be raised or lowered without changing its angle.

The end of the table or bench A where the anvil is set is beveled off slightly, and upon this beveled portion is arranged a jaw L, pivoted between lugs *l l*, rising from the table. This jaw L is formed with a pointed end L', that projects over the anvil I, and at its other end is pivotally attached to a vertically-movable rod M, that slides through a hole in the table and is attached at its lower end to a lever N, fulcrumed at *m* to a cross-piece *n* on the legs of the bench. The lever N projects toward the front end of the bench and is formed with a pedal-plate O, and a spring P surrounds the vertical rod M and is sustained by a pin *o* passing through the rod, the object of said spring being to return the lever and jaw to their normal position when pressure upon the lever is released.

The operation of the apparatus is as follows: The saw to be set, if circular, is laid upon the bench, the sleeve F passing up through the hole in the center of the saw. The sleeve is then adjusted toward or from the anvil until the teeth of the saw project over the anvil to the required extent and the sleeve is fixed in position by tightening up the nut D. The lever N is now depressed by the foot of the workman, thus elevating the vertical rod M and bringing the point of the jaw L down upon the tooth of the saw and bending the same an amount proportionate to the angle to which the anvil has been set. Every other tooth of the saw is set in this manner, and the saw is then turned over and the alternate teeth set in the opposite direction.

Figure 4:
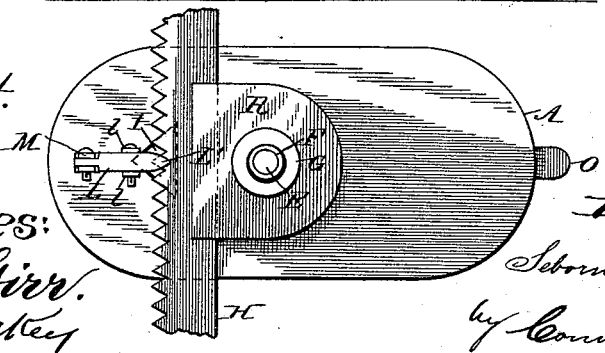

When it is desired to set a saw having a straight edge, a plate of metal R, provided with a hole for the passage of the bolt C, is placed upon the bolt under the sleeve F, and the saw is moved along under the jaw L in a straight line and the teeth set in the manner above described, the arrangement being shown in Fig. 4 of the drawings.

Having described my invention, I claim—

1. In a saw-setting apparatus, the combination of a suitable bench or table, an upright bolt adjustable thereon, an anvil fixed in the top of the bench and having an inclined top, and a movable jaw pivoted upon the bench with its end projected over said anvil and provided with an operating-lever N, connecting-rod M, and retracting-spring P, all constructed, arranged, and operating substantially as described.

2. In a saw-setting apparatus, the combination, with the bench or table A, having a slot B, the vertical bolt C, passing through said slot, and the sleeve F, adapted to sustain a saw, of the anvil I, the pivoted jaw L, and means, substantially as described, for operating said jaw, said means comprising a treadle N, connecting-rod M, and retracting-spring P, as set forth.

3. In a saw-setting apparatus, the combination, with the bench or table A and the adjustable bolt C, of the anvil I, the screws K and K' for adjusting said anvil to any required angle to the table, the movable jaw L, and means for operating said jaw, said means comprising the treadle N, connecting-rod M, and retracting-spring P, all constructed and arranged substantially as described.

4. In a saw-setting apparatus, the combination, with the table A and the pivoted jaw L, of the anvil I, set in said table, and the two set-screws K K' for adjusting the angle and height of the anvil, said screws being arranged one at the point and the other at the rear of the anvil and on a radial line from the center of the saw, substantially as described.

In testimony that I claim the foregoing I have hereunto set my hand this 26th day of January, 1891.

SEBORN JEFFERSON CROUCH.

Witnesses:
M. J. WRENN,
WM. PARTRIDGE.